United States Patent [19]

Kim et al.

[11] 4,124,692

[45] Nov. 7, 1978

[54] PREPARATION OF ANHYDROUS TaF$_5$

[75] Inventors: Chang J. Kim, Somerset; Dan Farcasiu, Princeton, both of N.J.

[73] Assignee: Exxon Research & Engineering Co., Linden, N.J.

[21] Appl. No.: 864,687

[22] Filed: Dec. 27, 1977

[51] Int. Cl.$^2$ .............................................. C01G 35/00
[52] U.S. Cl. .................................... 423/492; 252/415
[58] Field of Search .................. 423/62, 492; 252/415

[56] References Cited

U.S. PATENT DOCUMENTS

| | | | |
|---|---|---|---|
| 4,065,405 | 12/1977 | Hulme | 423/492 |
| 4,069,268 | 1/1978 | Siskin et al. | 423/492 |

*Primary Examiner*—O. R. Vertiz
*Assistant Examiner*—Wayne A. Langel
*Attorney, Agent, or Firm*—John W. Ditsler

[57] ABSTRACT

Anhydrous TaF$_5$ can be synthesized from a mixture comprising water and fluorotantalic acids by contacting said mixture with a dehydrating agent. Preferably, said mixture is formed by contacting tantalum oxides, tantalum oxide-halides or mixtures thereof with HF. The dehydrating agent should be a compound that contains carbon-chlorine bonds, carbon-bromine bonds or mixtures thereof.

14 Claims, No Drawings

PREPARATION OF ANHYDROUS TaF$_5$

BACKGROUND OF THE INVENTION

1. Field of the Invention

This invention relates to a new method for preparing anhydrous TaF$_5$. More particularly, this invention relates to the preparation of anhydrous TaF$_5$ from a mixture of water and fluorotantalic acids using one or more dehydrating agents.

2. Description of the Prior Art

TaF$_5$ is usually produced from tantalum metal or tantalum pentachloride by reaction with a variety of fluorinating agents such as HF, F$_2$, BrF$_3$, SnF$_2$ and the like (see for example F. Fairbrother, *The Chemistry of Niobium and Tantalum*; pages 74–88, Elsevier Publishing Co., New York 1961 and F. Fairbrother "The Halides of Niobium and Tantalum", *Halogen Chemistry*, Vol. 3, pages 123–131, 1967, the disclosures of which are incorporated herein by reference). However, tantalum metal is normally produced by the electrolysis of potassium fluorotantalate at temperatures of 800° C. or more, or by the reaction of potassium fluorotantalate using sodium metal, or by the reaction of tantalum carbide-tantalum oxide at temperatures of about 2000° C. (see Clifford A. Hampel, *Rare Metals Handbook*, 2nd Ed., Chapter 25, pages 472–476, Reinhold Publishing Corp., New York, 1961, the disclosure of which is incorporated herein by reference).

Similarly, tantalum pentachloride is often manufactured by chlorinating the pentoxide at elevated temperatures, e.g. temperatures of about 500° C. (see F. Fairbrother, *The Chemistry of Niobium and Tantalum*, as above). In addition to the need for such severe conditions, the use of fluorine is expensive and requires special equipment to compensate for the corrosive nature of the gas.

Therefore, in view of the disadvantages associated with the prior art processes, it would be desirable to have a simple and inexpensive technique for preparing anhydrous tantalum pentafluoride.

SUMMARY OF THE INVENTION

Now, in accordance with the present invention, a method has been found for synthesizing anhydrous TaF$_5$ by contacting a mixture comprising water and fluorotantalic acids with one or more dehydrating agents. This mixture may be represented as $xH_2O \cdot HTaF_6$ where $x$ is the atom ratio of oxygen to tantalum. Preferably, $x$ will be about 1.5 or less prior to contacting said mixture with the dehydrating agent. Suitable dehydrating agents include compounds which contain at least two carbon-chlorine bonds, at least two carbon-bromine bonds or mixtures thereof. When the reactants are contacted accordingly, there results gaseous compounds which can be easily removed, leaving behind anhydrous TaF$_5$. It is preferred that the mixture comprising water and fluorotantalic acids be formed by contacting tantalum oxides, tantalum oxidehalides or mixtures thereof with HF.

DETAILED DESCRIPTION OF THE INVENTION

The mixture comprising water and fluorotantalic acids can be prepared from virtually any tantalum compound that can be converted by HF to water and fluorotantalic acids. The mixture may be represented as $xH_2O \cdot HTaF_6$, where $x$ is the atom ratio of oxygen to tantalum. The value of $x$ will vary dependent upon the particular tantalum compound employed as well as the purity of the HF (i.e., the amount of water present therein). Although not necessary to the practice of the present invention, it is preferred that the HF be anhydrous.

Preferred tantalum compounds that can be suitably employed to form the mixture of water and fluorotantalic acids include tantalum oxides, tantalum oxidehalides or mixtures thereof. The halogen employed in the oxidehalide may be fluorine, chlorine, bromine or iodine. Specific examples of such tantalum compounds include Ta$_2$O$_5$, TaO$_2$, TaOF$_3$, TaOCl$_3$, TaOCl$_2$, TaOBr$_3$, TaOBr$_2$, TaOI$_3$, TaOI$_2$, TaO$_2$F and the like.

While the mechanism of the reaction is not known with certainty, it appears that the stoichiometry for forming said mixture using some of the above-mentioned tantalum compounds can be represented by the following equations:

$$Ta_2O_5 + 12HF \rightarrow 5H_2O \cdot 2HTaF_6 \quad (x/2.5) \quad (1)$$

$$TaO_2F + 5HF \rightarrow 2H_2O \cdot HTaF_6 \quad 2.0 \quad (2)$$

$$TaOF_3 + 3HF \rightarrow H_2O \cdot HTaF_6 \quad 1.0 \quad (3)$$

$$TaOCl_3 + 6HF \rightarrow H_2O \cdot HTaF_6 + 3HCl \quad 1.0 \quad (4)$$

The mixture of water and fluorotantalic acids is then reacted with a dehydrating agent to remove the water, thus forming anhydrous TaF$_5$. The dehydrating agent should be a compound that contains at least two carbon-chlorine bonds, at least two carbon-bromine bonds or mixtures thereof. Examples of suitable dehydrating reagents include CX$_4$, CHX$_3$, COX$_2$, CSX$_2$ where X is chlorine, bromine or mixtures thereof, and the like. Such dehydrating agents can also be formed by reacting materials that will form compounds having carbon-chlorine and/or carbon-bromine bonds. For example, CO can be contacted with Cl$_2$ to form phosgene, a suitable dehydrating agent. Thus, the dehydrating agent can be employed as such or formed in situ from its elements.

The water is removed from the water-fluorotantalic acids mixture by reaction with one or more dehydrating agents to form gaseous compounds such as CO, CO$_2$, COS, HX and the like. The gaseous compound formed will, of course, vary with the particular dehydrating agent employed. For example, if the dehydrating agents were phosgene and chloroform, the water would react as shown in the following equations:

$$H_2O + COCl_2 \rightarrow CO_2 + 2HCl \quad (5)$$

$$H_2O + CHCl_3 \rightarrow CO + 3HCl \quad (6)$$

In the case of phosgene, the overall reaction [as shown by combining equations (1) and (5)] may be represented as $$Ta_2O_5 + 12HF + 5COCl_2 \rightarrow 2TaF_5 + 5CO_2 + 10HCl + 2HF \quad (7)$$

The gaseous compounds are easily removed by standard techniques (e.g. venting, stripping with inert gas, distillation and the like), leaving behind solid, anhydrous tantalum pentafluoride.

Thus, equations (1)–(6) indicate that anhydrous TaF$_5$ can be prepared from any tantalum compound that can be converted by HF to a mixture of water and fluorotantalic acids. As such, the source of said mixture is immaterial to the practice of the present invention. However, a particularly economic source of said mixture is the aqueous fluorotantalate stream associated with processing of tantalum-containing ores (see Clifford A. Hampel, *Rare Metals Handbook*, as above, pages 472–473). Most of the water can be evaporated, and the residue then treated with anhydrous HF to produce a water-fluorotantalic acids mixture with $x$ ranging from about 2.0 to about 2.5.

It is preferred that the dehydration reaction of the water-fluorotantalic acids mixture be effected when $x$ is about 1.5 or less. While not wishing to be bound by any particular theory, it is believed that the atom ratio of oxygen to tantalum (which is equivalent to the mole ratio of water to fluorotantalic acids) is an important factor in determining the stability of said mixture at temperatures above 100° C. More particularly, it is believed that at least one molecule of water in the mixture exists in the form of a hydronium ion ($H_3O^+$), while any remaining water molecules are bound to said hydronium ion through hydrogen bonds. Thus when $x=1$, the mixture of water and fluorotantalic acids is believed to exist as $H_3O^+ \cdot TaF_6^-$, which is stable at about 150° C. However, when $x=2$ or more, the mixture of water and fluorotantalic acids decomposes at temperatures above 100° C. to form an oxidefluoride and HF, a mixture with which the dehydration reaction will not proceed satisfactorily.

Thus, when $x$ is greater than 1.5, it is preferred that $x$ be adjusted to 1.5 or less, more preferably 1.25 or less, by adding an appropriate amount of $TaF_5$ prior to contact with the dehydrating agent. For example, in the case of the mixture of water and fluorotantalic acids formed from reacting $Ta_2O_5$ and HF as shown in equation (1), $x$ can be lowered to 1.25 by adding 2 molar equivalents of $TaF_5$. Most preferably, the adjustment of $x$ will be made by recycling a suitable amount of the anhydrous $TaF_5$ product.

It is by no means essential to use the reactants in precisely the stoichiometric proportions, e.g. with the proportions shown in equations (1)–(6). For example, the amount of the dehydrating agent employed is not critical and will vary with the particular set of reactants. However, while the removal of water as volatile gases can proceed with small amounts of dehydrating agent, it is preferred that at least stoichiometric proportions be employed relative to the amount of oxygen present in the tantalum compound employed or in the water-fluorotantalic acids mixture. Thus, the mole ratio of water in the system to dehydrating agent be at least 1:1, preferably at least 1:1.5.

Similarly, in forming the mixture of water and fluorotantalic acids, although equations (1)–(4) will proceed with small amounts of HF, it is preferred to employ at least stoichiometric proportions relative to the tantalum compound to convert same to fluorotantalic acids. Thus, in the interest of efficient utilization of the tantalum, it is recommended to employ an excess amount of HF during reaction with said tantalum compound.

However, it is preferred that excess HF (i.e. the amount in excess of that required to convert the tantalum compounds to fluorotantalic acids) be removed prior to contact with the dehydrating agent since said agent(s) will react with the HF to form fluoro derivatives. For example, $CHCl_3$ will convert to $CHF_3$ which is not a dehydrating agent as defined herein.

The temperature of the reaction zone may range broadly, but should be maintained between about 50° and about 200° C. Preferably the temperature will range from about 75° to about 150° C. The pressure at which the reaction is effected is not critical to the present invention, and in general, will be the autogenous pressure developed by the reactants at the reaction temperature. Typically, the total pressure will range from about 0.1 to about 100 atmospheres. Depending upon the temperatures, reaction times can also range broadly. For example, reaction times of up to several days can be used. Preferably, the reaction time will range from about 1 to about 10 hours.

The reaction to synthesize anhydrous $TaF_5$ according to the present invention is believed to occur in the liquid phase. However, it is possible that small amounts of solid tantalum compounds may also be present. Thus, the term "substantially liquid phase" as used herein is meant to include a liquid phase reaction wherein said solids may be present. The present invention may be carried out in any suitable apparatus including batch, semi-continuous or continuous operation. The contacting or reaction zone may comprise one or more reaction zones arranged in series, or in parallel flow or both, with or without mechanical agitation. Equipment most suitable for a specific application is beyond the scope of the present invention and can be selected by one skilled in the art. Suitable materials of construction for contacting zones include Hastelloy C, Monel and other hydrogen fluoride-resistant materials such as Teflon, Kel-F, 316 stainless steel and the like.

The $TaF_5$ product has a variety of uses. For example, it has been used as a catalyst or component of a catalyst in a variety of hydrocarbon conversion reactions. (See for example, U.S. Pat. Nos. 3,708,553; 3,728,411; 3,852,184; 3,888,937; 3,901,790; 3,948,761; 4,025,459; 4,025,577; 4,036,737; 4,036,738; 4,043,900 and 4,048,251). A particularly beneficial application of the present invention is its use as a method of regenerating a catalyst containing tantalum pentafluoride and hydrogen fluoride. During the use of the $TaF_5/HF$ catalyst in a hydrocarbon conversion reaction, the activity of the catalyst declines due to the accumulation of organic and inorganic poisons. To recover anhydrous $TaF_5$ from the deactivated catalyst according to the present invention, the catalyst is first quenched with water and the impurities present in the resulting aqueous fluorotantalic acid solution are then separated therefrom using methods known to one skilled in the art (such as extraction). There remains an essentially pure water-fluorotantalic acid mixture which can then be converted to anhydrous $TaF_5$ by the present invention.

The following examples are presented to illustrate further the process of the present invention and are not intended to unduly restrict the limits of the claims appended hereto.

EXAMPLE 1

Conversion of $Ta_2O_5$ to Anhydrous $TaF_5$ Without Recycle of $TaF_5$

A mixture of tantalum pentoxide (11.0 gr) and hydrogen fluoride (35 gr) was heated at 90° C. overnight in a 100 cc Teflon-lined autoclave with a magnetic stirrer. Excess hydrogen fluoride (29 gr) was removed by distillation at 50° C., followed by addition of phosgene (15.0 gr). The reaction was carried out at about 140° C. for 8 hours with intermittent release of pressure. After no pressure increase was observed, the temperature was lowered to 100° C., the gases vented and the vessel flushed with dry nitrogen. Finally, a dark solid (ca. 15 gr) which did not melt below 150° C. was isolated. When analyzed, it was found to contain 54.6% Ta, 34.6% F, less than 0.3% Cl, less than 0.3% C, and 1.32% H. TaF$_5$ was calculated to contain 65.6 wt % Ta and 34.4 wt. % F.

This example shows that a mixture of water and fluorotantalic acids having a high atom ratio of oxygen to tantalum ($x=2.5$) does not undergo the dehydration reaction to completion.

EXAMPLE 2

Conversion of Ta$_2$O$_5$ to Anhydrous TaF$_5$ With Recycle of TaF$_5$

Cycle 1: A 100 cc Teflon-lined autoclave with a magnetic stirrer was charged with 5.5 gr of tantalum pentoxide (Ta$_2$O$_5$), 5.9 gr of tantalum pentafluoride (TaF$_5$), and 6.0 gr of hydrogen fluoride. The mixture was stirred at 100° C. for 2 hours before removing excess hydrogen fluoride by distillation. Phosgene (12.5 gr) was added, and the resulting mixture was stirred for 6 hours at 140° C. The temperature was lowered about 100° C., excess pressure was vented, followed by flushing with dry nitrogen. After cooling to room temperature (about 25° C.), the vessel was opened and 12.1 gr. of solid was collected. The solid melted at about 100° C.

Cycle 2: A 6.0 gr portion of the solid product from Cycle 1 was recycled to convert a fresh 5.5 gr batch of tantalum pentoxide by the same procedure as described for Cycle 1 except that the amount of phosgene used in this cycle was 9.1 gr. The final product isolated was 12.7 gr of a solid that had a melting point of 100° C. (uncorrected) and was found to contain 65.7% Ta, 34.4% F, and less than 0.3% Cl when analyzed.

Cycle 3: A 6.0 gr portion of the solid product from Cycle 2 was recycled to convert a fresh 5.5 gr batch of tantalum pentoxide by the same procedure as described for Cycle 1 except that the amount of phosgene used in this cycle was 9.1 gr. The final product was 11.9 gr of a solid having a melting point of 100° C. (uncorrected). A portion of the solid was analyzed and found to contain 65.4% Ta, 33.6% F and less than 0.5% Cl.

Overall, 16.5 gr of tantalum pentoxide was converted to 18.8 gr (91% of theory) of tantalum pentafluoride.

This example shows that a mixture of water and fluorotantalic acids with $x$ adjusted from 2.5 to 1.15 by recycle of TaF$_5$ readily undergoes a dehydration reaction to form anhydrous TaF$_5$ of high purity.

EXAMPLE 3

Regeneration of Deactivated HF/TaF$_5$ Catalyst

A 300 cc autoclave made of Hastelloy C and equipped with a stirrer was charged with 55.2 gr (0.2 mole) of tantalum pentafluoride, 8.8 gr hydrogen fluoride and 2.6 gr (0.15 mole) of water. The mixture was heated to 50° C. and the excess hydrogen fluoride was distilled therefrom. This procedure represented preparation of hydronium hexafluorotantalate, H$_3$O$^+$·TaF$_6^-$. Chloroform (36 gr. 0.30 mole) was then added and the temperature was raised to 150° C. At that temperature, pressure rose rapidly from 300 psig to 866 psig in a period of 15 minutes. The pressure was lowered by partial venting to a pre-evacuated sampling bomb, while the stirring was continued for another 30 minutes. At this point the pressure increase stopped. The vessel was cooled to room temperature, the gaseous products were combined and analyzed by Ir, GC and volumetric measurements.

A quantitative amount of carbon monoxide based on added water was found along with hydrogen chloride and a small amount of fluoroform. As shown in Table I, the anhydrous tantalum pentafluoride remaining in the vessel, when mixed with anhydrous hydrogen fluoride, showed a high activity for isomerization of n-hexane at 50° C. and a hydrogen pressure of 70 psig as measured by a first order rate constant.

EXAMPLE 4

Regeneration of Deactivated HF/TaF$_5$ Catalyst

By the same procedure as described in Example 3, 55.2 gr of tantalum pentafluoride, 4.8 gr hydrogen fluoride and 3.7 gr of water were converted to 0.20 mole of hydronium hexafluorotantalate. A combined mixture of 24.9 gr phosgene (0.25 mole) and 2.0 gr chlorine (0.028 mole) was introduced, and the temperature was raised to 100° C. At that temperature, the pressure rose gradually from 252 psig to 846 psig over a period of 2.5 hours, and stabilized thereafter. The analysis showed the amount of carbon dioxide formed was 88% of the calculated value based on water. The vessel was purged with hydrogen at 100° C., hydrogen fluoride was added and the rate of n-hexane isomerization was measured. As shown in Table I, the activity was found to be comparable to that of fresh catalyst.

EXAMPLE 5

Regeneration of Deactivated HF/TaF$_5$ Catalyst

According to the procedure described in Example 4, 0.20 mole of hydronium hexafluorotantalate was prepared in a 300 cc autoclave. Chlorine (20.9 gr, 0.29 mole) and carbon monoxide (0.25 mole) were charged, and heated to 75° C. At that temperature the pressure first decreased from 648 psig to 390 psig over a period of 9 hours and then increased to 818 psig over 2 days. A quantitative amount of carbon dioxide was formed based on added water. As shown in Table I, the dehydrated tantalum pentafluoride in the vessel showed an improved activity for n-hexane isomerization.

Table I

| HF/TaF$_5$ Catalyst (3.0 mole/0.2 mole) | Measured Activity (hr$^{-1}$) |
|---|---|
| Fresh catalyst | 16 |
| Catalyst deactivated by water addition | 0.4 |
| Regenerated Catalyst | |
| Example 3 | 7.6 |
| Example 4 | 15.5 |
| Example 5 | 1.8 |

Examples 3-5 show that a deactivated HF/TaF$_5$ hydrocarbon conversion catalyst can be regenerated according to the present invention such that it can be suitably employed to effect hydrocarbon conversion reactions.

What is claimed is:

1. A process for the preparation of anhydrous TaF$_5$ which comprises contacting a mixture comprising water and fluorotantalic acids with a dehydrating agent containing at least two carbon-chlorine bonds, at least two carbon-bromine bonds or mixtures thereof for a period of time sufficient to convert at least a portion of said mixture to anhydrous TaF$_5$.

2. The process of claim 1 wherein said contacting is effected at temperatures ranging from about 50° to about 200° C.

3. The process of claim 1 wherein said dehydrating agent is selected from the group consisting of $CHX_3$, $CX_4$, $COX_2$, $CSX_2$ and mixtures thereof, where X comprises chlorine, bromine or mixtures thereof.

4. The process of claim 1 wherein the mole ratio of water to dehydrating agent is at least 1:1.

5. The process of claim 1 wherein said anhydrous $TaF_5$ is recovered, and a portion thereof is recycled to said mixture such that the atom ratio of oxygen to tantalum therein is about 1.5 or less.

6. The process of claim 1 wherein the atomic ratio of oxygen to tantalum in said mixture is about 1.5 or less.

7. The process of claim 6 wherein said atomic ratio is obtained by adding $TaF_5$ to said mixture.

8. A process for the preparation of anhydrous $TaF_5$ which comprises contacting a tantalum compound comprising tantalum oxides, tantalum oxidehalides or mixtures thereof with HF and with a dehydrating agent comprising at least two carbon-chlorine bonds, at least two carbon-bromine bonds or mixtures thereof for a period of time sufficient to convert at least a portion of said tantalum compound to anhydrous $TaF_5$.

9. The process of claim 8 wherein said contacting is effected at temperatures ranging from about 50° to about 200° C.

10. The process of claim 8 wherein said tantalum compound is selected from the group consisting of $Ta_2O_5$, $TaO_2$, and mixtures thereof.

11. The process of claim 8 wherein said tantalum compound is selected from the group consisting of $TaOX_3$, $TaO_2X$, $TaOX_2$ and mixtures thereof where X is a halogen.

12. The process of claim 8 where said HF is anhydrous.

13. The process of claim 8 wherein the atomic ratio of oxygen to tantalum in said mixture is about 1.5 or less.

14. The process of claim 13 wherein said atomic ratio is obtained by adding $TaF_5$ to said mixture.

* * * * *